H. T. BRIGGS.
Spoke-Socket and Felly-Plate.

No. 159,149. Patented Jan. 26, 1875.

UNITED STATES PATENT OFFICE.

HARRISON T. BRIGGS, OF BUCHANAN, MICHIGAN.

IMPROVEMENT IN SPOKE-SOCKETS AND FELLY-PLATES.

Specification forming part of Letters Patent No. 159,149, dated January 26, 1875; application filed October 27, 1874.

*To all whom it may concern:*

Be it known that I, HARRISON T. BRIGGS, of Buchanan, in the county of Berrien and in the State of Michigan, have invented certain new and useful Improvements in Wheels for Vehicles; and do hereby declare that the following is a full, clear, and exact description thereof, reference being had to the accompanying drawings and to the letters of reference marked thereon, making a part of this specification.

The nature of my invention consists in the construction and arrangement of a device for uniting spokes to fellies, as will be hereinafter more fully set forth.

In order to enable others skilled in the art to which my invention appertains to make and use the same, I will now proceed to describe its construction and operation, referring to the annexed drawing, in which—

Figure 1:
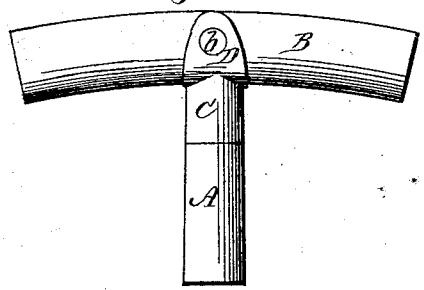
Figure 2:
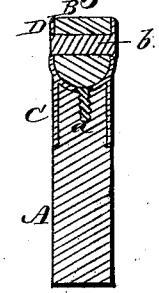
Figure 3:
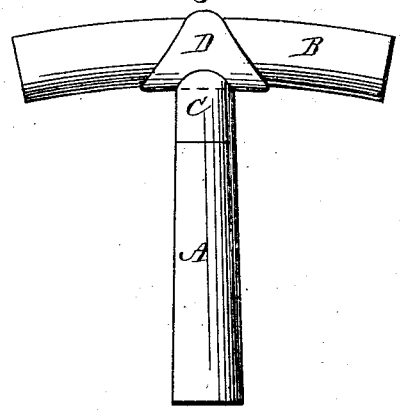
Figure 4:
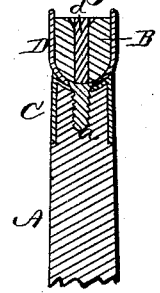
Figure 5:
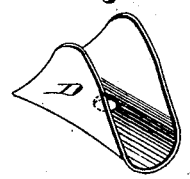

Figures 1 and 3 are side views of my invention. Figs. 2 and 4 are sections of the same, and Fig. 5 is a perspective view of a part thereof.

A represents part of a wheel-spoke, and B part of the felly. To unite these parts I use a metallic union consisting of a ferrule, C, and an inverted cap, D. These may be made in one piece, as shown in Figs. 1 and 2, or of separate pieces, as shown in Figs. 3 and 4. The ferrule is placed on the end of the spoke, and the ferrule and cap fastened by a single screw, $a$, passing through them into the end of the spoke. The felly B fits in the inverted cap D, and the cap is fastened thereto by a rivet, $b$, passing through them. The ends of the cap on both sides of the felly extend beyond the same, so as to prevent the tire from coming off without the aid of bolts or nails or screws, as is the usual way of fastening the tire on. Through the felly B is passed a small iron pin, $d$, extending from the union C D to the tire, to prevent the tire from giving or denting under too great a pressure.

With this device of fastening or uniting the spoke and felly, they are held firmly together without any liability of coming apart, and the same device may be used for uniting any two pieces of wood.

Having thus fully described my invention, what I claim as new, and desire to secure by Letters Patent, is—

In combination with the spoke A and felly B, the ferrule C and cap D, extended beyond the felly to hold the tire, and the pin $d$ passing through the felly under the tire, and bearing upon the head of the screw $a$, which holds the union C D to the spoke, all substantially as set forth.

In testimony that I claim the foregoing I have hereunto set my hand this 3d day of October, 1874.

HARRISON T. BRIGGS.

Witnesses:
    C. L. EVERT,
    E. O. ALLIGER.